United States Patent [19]

van de Polder

[11] 3,717,729

[45] Feb. 20, 1973

[54] COLOR TELEVISION RECEIVER FOR DISPLAYING A RECEIVED TELEVISION SIGNAL ON A PICTURE TUBE OF THE INDEXING TYPE

[75] Inventor: Johan Leendert van de Polder, Emmasingel, Eindhoven, Netherlands

[73] Assignee: U.S. Philips Corporation, New York, N.Y.

[22] Filed: June 9, 1971

[21] Appl. No.: 151,586

Related U.S. Application Data

[63] Continuation of Ser. No. 804,410, March 5, 1969, abandoned.

[52] U.S. Cl. ...............................178/54 F, 178/5.4 P

[51] Int. Cl. ...............................................H04m 9/24

[58] Field of Search ........178/5.4, 5.4 P, 5.4 F, 5.4 H

[56] References Cited

UNITED STATES PATENTS

| | | | |
|---|---|---|---|
| 3,234,324 | 2/1966 | Mutschler | 178/5.4 F |
| 3,492,417 | 1/1970 | Scholz | 178/5.4 P |

FOREIGN PATENTS OR APPLICATIONS

| | | | |
|---|---|---|---|
| 1,186,902 | 2/1965 | Germany | 178/5.4 P |
| 1,186,902 | 2/1965 | Germany | 178/5.4 P |

*Primary Examiner*—Robert L. Griffin
*Assistant Examiner*—Donald E. Stout
*Attorney*—Frank R. Trifari

[57] ABSTRACT

A circuit for converting a PAL television signal so that it can be displayed on an index picture tube features two mixer stages. An index signal is applied to the mixers. A line frequency commutator alternately applies the modulated and unmodulated subcarrier signal to each of the mixer stages.

6 Claims, 1 Drawing Figure

PATENTED FEB 20 1973 3,717,729
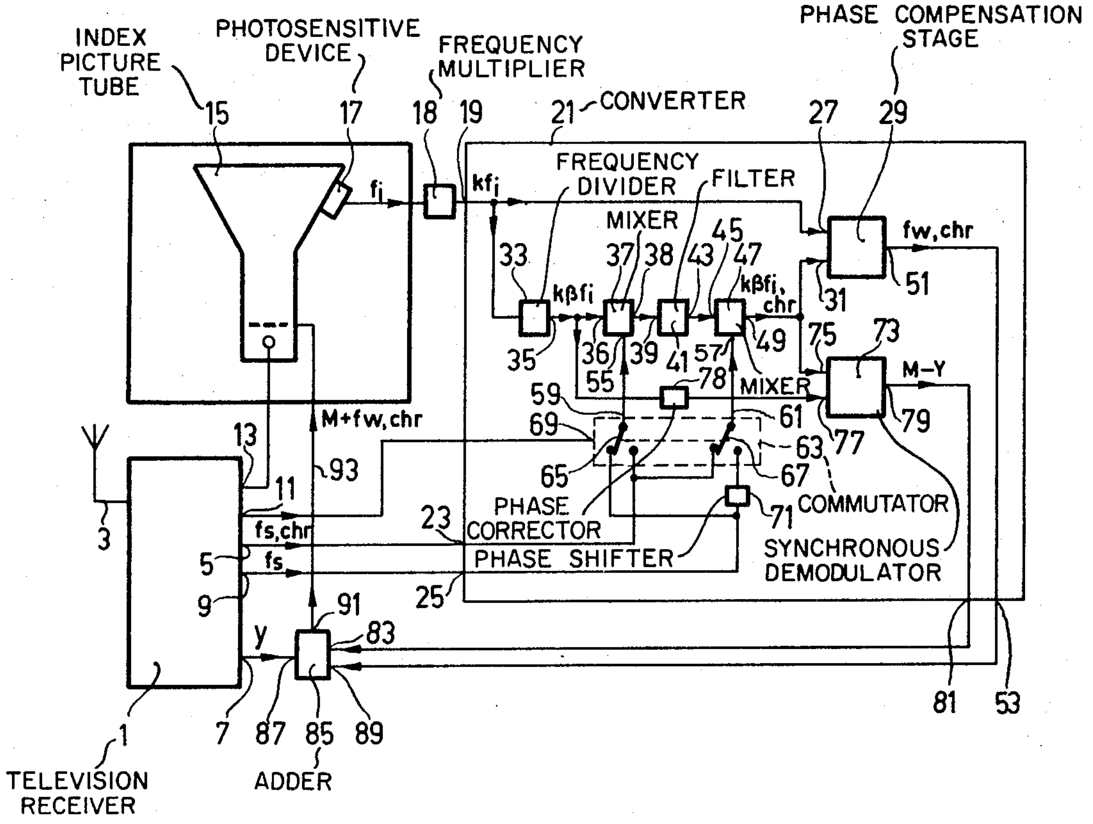
INVENTOR.
LEENDERT J. VAN DE POLDER
BY
Frank R. Trifari
AGENT

COLOR TELEVISION RECEIVER FOR DISPLAYING A RECEIVED TELEVISION SIGNAL ON A PICTURE TUBE OF THE INDEXING TYPE

CROSS REFERENCE TO RELATED APPLICATIONS

This application is a continuation of application Ser. No. 804,410 filed Mar. 5, 1969 and now abandoned.

The invention relates to a color television receiver for displaying a received television signal on a picture tube of indexing type, comprising a converter having a first input to which a carrier wave signal of an indexing frequency ($f_i$) generated by means of the picture tube can be applied, a second input to which a received color-sub-carrier signal ($f_{s,chr}$) modulated by color information can be applied, and a third input to which an unmodulated color sub-carrier signal ($f_s$) regenerated in the receiver can be applied, and having an output from which a signal ($f_{w,chr}$) of a writing frequency modulated by color information and suitable for displaying on the indexing tube can be derived, the converter comprising two mixer stages an input of one of said mixer stages is connected to the second and an output of the other of the said mixer stages is connected to the third input of the converter.

A converter for a receiver of the above mentioned type is known from J. Davidse: Transmission and Decoding in Color television, pp. 164–167, in which the said mixer stages are incorporated after each other in one of the branches or each in a different branch of a phase compensating circuit. The known converter is suitable for converting a color information signal ($f_{s,chr}$) modulated on a color sub-carrier ($f_s$) into a color information signal ($f_{w,chr}$) with a frequency suitable for displaying on the indexing tube.

It is the object of the invention to provide a color television receiver for a PAL-color television signal with a simple converter.

According to the invention, a television receiver of the type mentioned in the preamble is characterized in that a commutator is incorporated in the connections from the said inputs of the mixer stages to the inputs of the converter for alternately connecting, during one line period, the input of the one mixer stage to the second input and the input of the other mixer stage to the third input and, during the next line period, connecting the input of the one mixer stage to the third input and the input of the other mixes stage to the second input of the converter, to which second input a quadrature-modulated color sub-carrier signal obtained by detection and filtering from a receiver PAL color television signal can be applied, in which quadrature modulated signal one of the quadrature components reflects from line to line in phase with respect to the other quadrature component.

The advantage is obtained that without using a delay line a PAL signal can simply be made suitable for display on an indexing tube.

In order that the invention may be readily carried into effect, one embodiment thereof will not be described in greater detail, by way of example, with reference to the accompanying drawing, the sole FIGURE of which shows an embodiment of the invention in which details which are of no importance for the invention are now shown.

The FIGURE shows a block-schematic diagram of a color television receiver according to the invention for a PAL-color television signal having a picture tube of the indexing type.

A part 1 in the FIGURE comprises an input 3 for supplying a received PAL-color television signal. In the part 1 a received color television signal is, for example, HF and IF-amplified and divided into a chrominance signal $f_{s,chr}$ and a luminance signal Y. The chrominance signal $f_{s,chr}$ becomes available at an output 5 and the luminance signal Y at an output 7 of the part 1.

Furthermore a regeneration of a color sub-carrier signal $f_s$ takes place in the part 1 which signal appears at an output 9. A switching signal of half the line frequency is furthermore derived from the color television signal and appears at an output 11.

The part 1 also comprises supply voltage and deflection generators which, like other functions, if any, are of no significance for understanding the invention and are therefore not shown.

An output 13 of the part 1 is connected to a cathode of a picture tube 15 of the indexing type. Through this connection the cathode of the picture tube 15 receives a supply voltage while the cathode current in the part 1 can be measured, for example, to obtain a correct background current for the picture tube.

The screen of the picture tube 15 comprises strips which, upon scanning by an electron beam, for example, irradiate ultraviolet light which is converted into an alternating voltage of indexing frequency $f_i$ by means of a photosensitive device 17. The signal $f_i$ from the photosensitive device 17 is conducted through a limiting and multiplication stage 18 and applied with a frequency $kf_i$ to a first input 19 of a converter 21. A second input 23 of the converter 21 receives the chrominance signal $f_{s,chr}$ from the output 5 and a third input 25 receives the regenerated unmodulated color sub-carrier signal $f_s$ from the output 9 of the part 1.

The unmodulated signal of the frequency $kf_i$ applied to the input 19 of the converter 21 is directly supplied to an input 27 of a phase compensation stage 29 and, through a phase compensation branch, to an input 31 thereof. Viewed from the input 19 the phase compensation branch comprises successively a frequency divider 33 having an output 35, a mixer stage 37 connected with its input 36 to the output 35 and having an output 38, a filter 41 connected with its input 39 to the output 38 and having an output 43, and a mixer stage 47 connected with its input 45 to the output 43 and having an output 49 which is connected to the input 31 of the phase compensation stage 29.

An output 51 of the phase compensation stage 29 is connected to an output 53 of the converter 21.

The mixer stages 37 and 47 furthermore comprise inputs 55 and 57, respectively, which according to the invention are connected to outputs 59 and 61, respectively, of a commutator 63. The commutator 63 comprises change-over contacts 65 and 67, respectively, which are kept in a different position from line to line by means of a change-over signal originating from the output 11 of the part 1 and applied to an input 69. The commutator 63 is included according to the invention in the connections from the inputs 55 and 57 of the mixer stages 37 and 47 to the second input 23 and the third input 25 of the converter 21. The input 55 of the mixer stage 37 hence is connected during one line period through the change-over contact 65 to the third input 25 (position shown) and during the next line period to the second input 23 of the converter (position not shown). At the same time the input 57 of the other mixer stage 47 is connected, through the change-over contact 67, to the second input 23 during one line period, and, during the next line period, through a phase-shifting network 71 incorporated according to an elaboration of the invention in a connection to the commutator 63, to the third input 25 of the converter 21.

As a result of these commutations a quadrature-modulated color sub-carrier is applied during one line period to the input 57 of the mixer stage 47 and an unmodulated color sub-carrier is applied to the input 55 of the mixer stage 37 (position of the change-over contact 65, 67 shown). During the next line period, on the contrary, the quadrature-modulated color sub-carrier is applied to the input 55 of the mixer stage 37 and the unmodulated sub-carrier is applied to the input 57 of the mixer stage 47, through the correction network 71 (position not shown of the change-over contacts 65, 67). As a result of this the sequence in which the two signals are injected in the phase compensation branch is varied from line to line.

According to an elaboration of the invention, the converter 21 furthermore comprises a synchronous demodulation device 73 having an input 75 connected to an output 49 of the mixer stage 47. A signal originating from the phase-compensation branch 19–31 is applied to said input 75, which signal contains, in a somewhat modified form, the modulation of the color sub-carrier signal applied to the second input 23. By inverting the sequence in which the signals are applied to the inputs 55 and 57 of the said mixer stages 37 and 47 from line to line, the line-wise inversion of the phase of one of the two quadrature components, as it occurs in the modulated color subcarrier applied to the second input 23, is eliminated. The two quadrature components in the signal at the input 75 of the synchronous demodulation device 73 thus remain constant of phase.

The input 77 of the synchronous demodulation device 73 is connected, through a phase correction network 78, to the input 36 of the mixer stage 37 and receives an unmodulated signal of the same frequency as that of the modulated signal at the input 75. The phase ratio between the signals applied to the inputs 75 and 77 is made in the synchronous demodulation device 73 to be such that it supplies a luminance correction signal (M-Y) at an output 79.

The output 79 of the demodulation device 73 is connected to an input 83 of an adder 85 through an output 81 of the converter 21. The adder 85 comprises another two inputs 87 and 89 which are connected to the output 7 of the part 1 and to the output 53 of the converter 21, respectively. As a result of this the luminance signal Y is applied to the input 87 and a signal of a so-called writing frequency ($f_{w,chr}$) modulated by color information is applied to the input 89. This signal applied to the inputs 89 of writing frequency comprises the modulation of the signal applied to the second input 23 of the converter 21, albeit with a phase of the quadrature components which is equal from line to line in contrast with the phase of one of the quadrature components at the second input 23 which varies from line to line.

The adder 85 comprises an output 91 at which an adapted brightness signal M and the chrominance signal of writing frequency ($f_{w,chr}$) quadrature-modulated by color information appears which are applied for display to the grid of the picture tube 15, through a relative connection 93.

Only the operation of the converter 21 is of importance for understanding the invention and this will be described in detail below.

The converter 21 fulfils the following functions:

a. a conversion of the indexing frequency $f_i$ into the writing frequency $f_w$.

b. a phase compensation, that is to say, the phase of the signal remains correct independently of the frequency $f_i$ of the indexing signal so that at scanning rates slightly differing from the nominal rate of the electron beam in the picture tube 15, a correct color rendition is always obtained.

c. The introduction of the color information into the writing signal.

d. The conversion according to the invention of the phase alternation in the PAL-color information into a constant phase necessary for the correct display of the color information by the indexing tube 15.

e. The obtaining according to the invention of a luminance correction signal (M-Y).

Ad a

The conversion of the indexing frequency $f_i$ into the writing frequency $f_w$ is carried out as follows:

In the stage 18 the indexing signal ($f_i$) is multiplied in frequency by a factor $k$ and applied to the input 19 of the converter 21. The signal ($kf_i$) is then applied directly to the input 27 of the phase compensation stage 29. To the other input 31 thereof, a signal ($k\beta f_i$) is applied which is obtained from the signal ($kf_i$) applied to the input 19 through the phase compensation branch: frequency divider 33, mixer stage 37, filter 41 and mixer stage 47 and which is frequency-coupled to the indexing signal. The phase compensation stage 29 comprises a mixer stage in which the signals applied to the inputs 27 and 31 are mixed. As a result of this a signal having a frequency $f_w$ is formed at the output 51 of the phase compensation stage 29, which signal is in a fixed ratio with the frequency $f_i$ of the indexing signal. This ratio must be equal to the ratio between the number of indexing strips and the number of groups of color strips of the picture tube 15 per length unit and usually is 3/2 or 3/4.

Ad b

The phase compensation is carried out, for example, by a correct choice of the transit times in the compensation branch 19–31 with given transit times of the rest of the indexing loop which extends from the photo sensitive device 17 through the amplifier and limiter 18, the input 19 and the output 53 of the converter 21, the adder 85, the indexing tube 15, back to the photosensitive device 17. In connection with the synchronous (M-Y) detector 73 present in this example, which obtains its signals from the phase compensation branch, the transit time between the input 71 and the input 75 thereof is preferably kept as small as possible. The transit time necessary for a phase compensation is for that purpose preferably provided in the supply to the input 31 of the phase compensation stage 29. When this compensation transit time is made adjustable, the phase of the writing signal ($f_{w,chr}$) to be reproduced can be adjusted by means of this and hence the color tone of the displayed picture.

Ad c

The introduction of the color information is carried out through the mixer stages 37 and 47, the frequency of the sub-carrier on which the said information was originally modulated and which is not related to the indexing frequency being eliminated. In the frequency divider 33, the signal ($kf_i$) applied to the input 19 is frequency-divided and brought at a frequency $k\beta f_i$. In the mixer stage 37, in combination with the filter 41, the frequency of the signal is increased or decreased by a frequency $f_s$ of the signal applied to the input 55, to ($k\beta f_i + f_s$) and ($k\beta f_i - f_s$), respectively, after which in the mixer stage 47 in which a filter is provided the frequency is again decreased and increased, respectively, by the frequency $f_s$ of the signal applied to the input 57 to $(k\beta f_i + f_s - f_s) = k\beta f_i$ and $(k\beta f_i - f_s + f_s) = k\beta f_i$, respectively. One of the signals applied to the inputs 55 or 57 is quadrature-modulated by the color information so that said modulation is transmitted in the relative mixer stage to the output signal thereof and also appears in the signal ($k\beta f_{i,\,chr}$) of the frequency $k\beta f_i$ appearing at the output 49 of the mixer stage 47.

Ad d

The elimination of the phase shift of one of the quadrature components in the quadrature-modulated color sub-carrier signal of the PAL-type which is applied to the second input 23 of the converter 21 is obtained as follows:

According to the invention, as already described, the sequence in which the unmodulated color sub-carrier signal is applied in the phase compensation branch 19 – 31 through the second input 23 is changed from line to line by means of the commutator 63.

Let it be assumed that the signal at the input 36 of the mixer stage 37, has the form $U_1 \sin k\beta\omega_i t$, the signal at the second input 23 has the form $U_2 \sin [\omega_s t - \phi(t)]$ during one line, and has the form $U_2 \sin [\omega_s t - \phi(t)]$ during the next line and the signal at the third input 25 has the form $U_3 \sin (\omega_s t + \alpha)$.

Herein, $U_2$ is variable and decisive of the saturation of the color to be reproduced. $\phi(t)$ is also variable and determines the color tone of the color to be reproduced. The quantities $U_1$, $U_3$, $\omega_s$ and $\alpha$ constants.

Let it furthermore be assumed that in the first mixer stage 37, in cooperation with the filter 41, frequencies of the signals applied to the inputs 55 and 36 are added and in the second mixer stage 47, as a result of the filter present therein, the frequencies of the signals applied to the inputs 45 and 57 are subtracted.

In that case a signal of the form $-U_4 \cos [(k\alpha\omega_i + \omega_s) t + \alpha]$ appears at the output 38 of the mixer stage 37, and hence at the input 45 of the mixer stage 47 during one line time in the position shown of the changeover contacts 65, 67 of the commutator 63. Signals of other frequencies are suppressed by the filter 41. The signals $-U_4 \cos [(k\beta\omega_i + \omega_s) t + \alpha]$ is mixed in the mixer stage 47 with the signal applied to the input 57 thereof of the form $U_2 \sin [\omega_{st} + \phi(t)]$. A signal of the form $U_5 \sin [k\beta\omega_i t - \phi(t) + \alpha]$ then appears at the output 49 of the mixer stage 47.

The next line period the signal $U_1 \sin [k\beta\omega_i + \alpha]$ is applied to the input 36 of the mixer stage 37 and the signal $U_2 \sin [\omega_s t - \phi(t)]$ is applied to the input 55. A signal of the form $-U_6 \cos [(k\beta\omega_i + \omega_s) t - \phi(t)]$ then appears at the output 38 and hence at the input 45 of the mixer stage 47. This signal is mixed in the mixer stage 47 with the signal applied to the input 57 thereof and having the form $U_3 \sin (\omega_s t + \alpha + \delta)$. *In this signal* $\delta$ *is the phase shift which occurs in the phase shifting network 71. A signal of the form* $U_7 \sin [k\beta\omega_i t - \phi(t) - \alpha - \delta]$ then appears at the output 49 of the mixer stage 47.

So it appears from the above that a signal of the form $U_5 \sin [k\beta\omega_i t - \phi(t) + \alpha]$ appears at the output 49 during one line period and a signal of the form $U_7 \sin [k\beta\omega_i t - \phi(t) - \alpha - \delta]$ appears during the other line period. The frequencies of these signals are equal. The amplitude $U_5$ and $U_7$ can be made equal by the correct choice of the elements of the mixer stages 37 and 47. The phase information regarding the color tone $\phi(t)$ is present in the two signals with the same sign while by a choice of $\delta = -2\alpha$ the phase of the two signals can be made equal. The fact that in phase information $\phi(t)$ regarding the color hue occurs with a negative sign is only of importance in connection with the sequence in which the color dots occur on the screen of the indexing tube. When this sequence is different, the sign of $\phi(t)$ can be made positive by changing the sequence in which the sub-carrier signals are applied to the mixer stages 37 and 47.

By adjusting the phase angles $\alpha$ and $\delta$ a correction of the color hue of the picture to be displayed is possible.

As appears from the above, a signal suitable for display on an indexing tube can be obtained in a simple manner by means of the converter according to the invention.

Ad e

The obtaining of the luminance correction signal (M – Y) in the synchronous detection device 73, can now simply be understood. During each line period a signal of the form $U_5 \sin [k\beta\omega_i t - \phi(t) + \alpha]$ is applied to the input 75 and a signal of the form $U_1 \sin k\beta\omega_i t$ is applied to the input 77, the signal $U_5 \sin [k\beta\omega_i t - \phi(t) + \alpha]$ being a signal which is quadrature-modulated by color difference signals. The maintenance of the phase relationship between the said two signals also at frequencies slightly differing from the nominal frequency is obtained by the phase correction network 78 between the output 35 and the input 77. In the frequency range used this phase correction network must have the same phase characteristic as the circuit between the output 35 and the input 75. For clearness sake the frequency-dependent phase angles as a result of the circuits 35-77 and 35-75 are not denoted in the formulas used. The signals $U_1 \sin k\beta\omega_i t$ and $U_5 \sin [k\beta\omega_i t - \phi(t) + \alpha]$ have the same frequency and a fixed phase relationship and can be applied to a synchronous detector. By suitable choice of the phase ratio in which said signal are applied to said synchronous detector, a luminance correction signal M – Y can be obtained at the output of such a detector and hence at the output 79 as is well known. In the receiver according to this example, a (M − Y) signal is obtained from the PAL-color signal by synchronous detection without an extra phase alternating device.

In the example described, the mixer stages were connected after each other in the same branch of the phase compensation circuit. It will be obvious that it is alternatively possible for obtaining a non-changing phase of the modulation of the color signal to incorporate the mixer stages, for example, in different branches of the phase compensation circuit if only the mixer stages perform an opposite operation, that is to say, one mixer stage must add the frequencies of the signals added thereto and the other must subtract them. The frequency multiplication in the stage 18 may then be omitted sometimes. In the example described the multiplication in said stage 18 simplifies the filtering problem in the phase compensation branch.

It will furthermore be obvious that the phase shifting network 71 may also be incorporated in another supply to the commutator 63. It may also be incorporated, for example, so that the phase shift produced by it is operative in the two mixer stages 37 and 47, so that any error caused by one of the change-over contacts 65 or 67 can be compensated for.

In the example described the quadrature-modulated color sub-carrier signal is applied unadapted to the mixer stage 37 or 47. Certain color errors in the display on the picture tube 15 must then be taken into the bargain. This is acceptable for cheap color television receivers. The advantage of a visual averaring of color errors which are the result of a differential phase error is obtained indeed.

By means of a simple extension according to a further elaboration of the invention it is possible to obtain a nearly complete removal of the said color errors when the receiver is used for handling a PAL signal in which the quadrature components of the color sub-carrier have the form $c(B-Y)\sin\omega_s t$ and $\pm d(R-Y)\cos\omega_s t$. This can be done by means of a modulator to be incorporated according to the invention in the connection from the output 5 of the part 1 to the input 23 of the converter. To this modulator must be applied a signal of double the sub-carrier frequency — $a\cos 2\omega_w t$ and the color signal $[c(B-Y)\sin\omega_s t \pm d(R-Y)\cos\omega_s t]$. The output signal of said modulator then obtains the form $c(1+\frac{1}{2}a)(B-Y)\sin\omega_s t \pm d(1-\frac{1}{2}a)(R-Y)\cos\omega_s t$. By suitable choice of $a$, the amplitude ratio between the sine and cosine components can be made equal to $0.74(B-Y)/0.89(R-Y)$ so that in that case only a phase error of approximately 2° of the sine component with respect to the cosine component remains as a residual error compared with a completely adapted C.C.S. color signal, which is substantially negligible. In the signals applied to the said modulator an amplitude or phase of a signal supplied thereto need not be adapted from line to line.

The construction of the commutator 63 has not been described in the above specification, because this is of no importance for the essence of the invention. It is possible, for example, to construct it by means of so-called long-tailed transistor pairs which lend themselves excellently for incorporation in an integrated circuit.

What is claimed is:

1. A circuit for converting a PAL color television signal into a form suitable for application to an index picture tube, said circuit comprising a phase compensation stage having two inputs and an output; first and second phase compensation branch means for receiving and applying an index signal from said tube to said phase compensation stage inputs respectively; a first mixer coupled within one of said branches; a second mixer coupled within one of said branches; and commutator means operating at one half of the television line frequency for alternately applying to each of said mixers the unmodulated subcarrier and chrominance modulated subcarrier components of said television signal, each of said mixers having a different one of said components applied thereto from the component applied to the other mixer at any instance, whereby said phase compensation stage output supplies said television signal suitable for application to the index tube.

2. A circuit as claimed in claim 1 further comprising means for phase shifting one of said television signal components.

3. A circuit as claimed in claim 2 wherein said phase shifting means shifts the phase of said unmodulated subcarrier component.

4. A circuit as claimed in claim 1 wherein said first and second mixers are serially coupled in the order recited and both located within said first branch.

5. A circuit as claimed in claim 4 further comprising a synchronous demodulator having a first input coupled to the input of said first mixer for supplying an unmodulated reference signal, and a second input coupled to the output of said second mixer.

6. A circuit as claimed in claim 5 further comprising a phase correction network coupled between said first mixer input and said synchronous demodulator first input.

* * * * *